(No Model.)
R. EBERHARD.
BEER FAUCET.
No. 261,914. Patented Aug. 1, 1882.
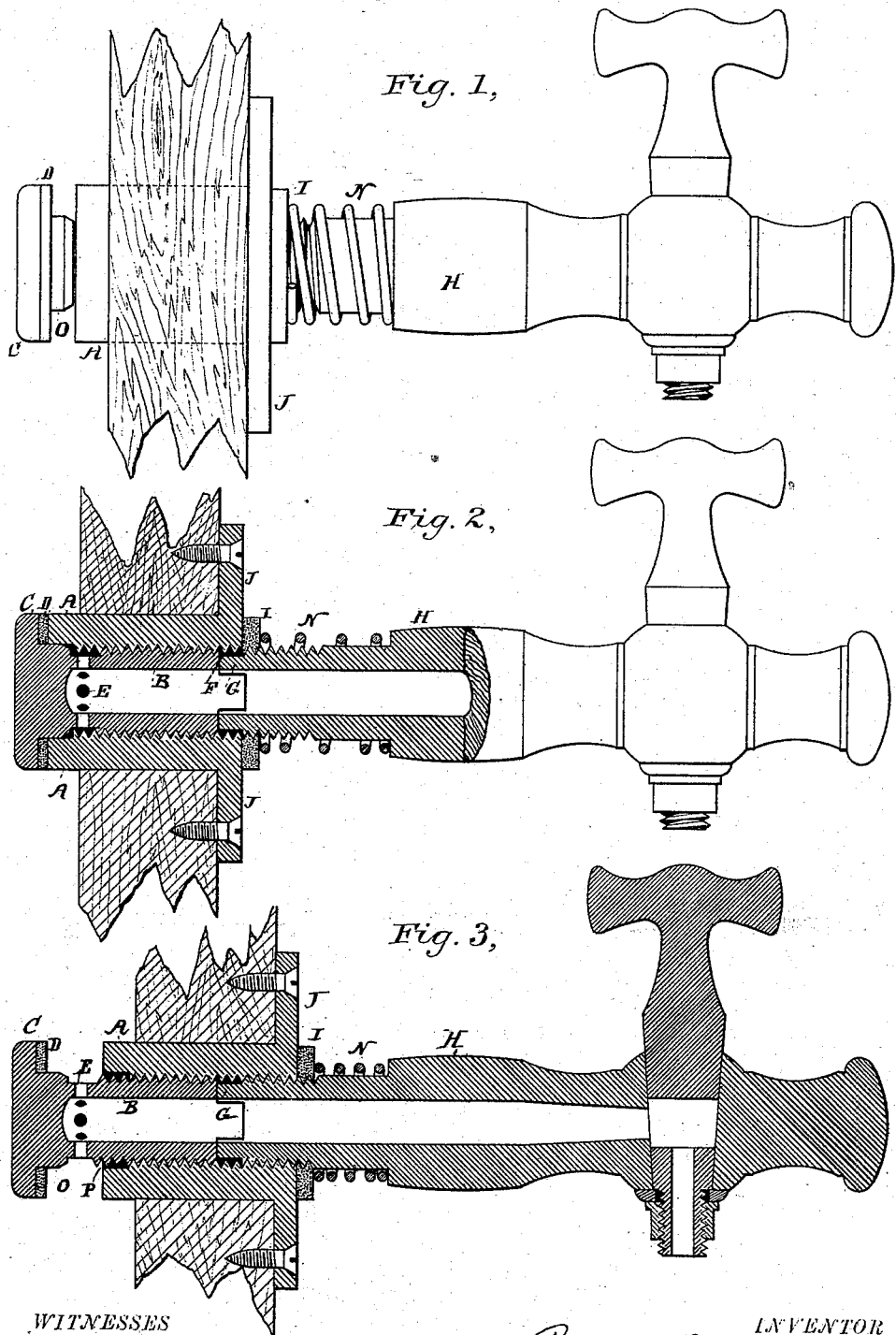
WITNESSES
Geo. W. Breek,
Edwin Newman,
INVENTOR
Rudolph Eberhard
By his Attorney
A. M. Tanner

UNITED STATES PATENT OFFICE.

RUDOLPH EBERHARD, OF SAN FRANCISCO, CALIFORNIA, ASSIGNOR OF ONE-HALF TO JACOB BOEGLI, OF SAME PLACE.

BEER-FAUCET.

SPECIFICATION forming part of Letters Patent No. 261,914, dated August 1, 1882.

Application filed December 31, 1881. (No model.)

*To all whom it may concern:*

Be it known that I, RUDOLPH EBERHARD, a citizen of Switzerland, residing at San Francisco, in the county of San Francisco and State of California, have invented certain new and useful Improvements in Beer-Faucets; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The present invention relates to that class of faucets for drawing beer and other liquids from barrels consisting essentially of a screw-threaded bushing and a faucet having a correspondingly-threaded shank, which, when screwed into the bushing, serves to open a valve at the inner end of the latter.

The object of the invention is to provide means whereby the flow of the liquid cannot take place until the connection between the valve and the faucet has been properly effected and said valve moved beyond the inner end of the bushing.

It also consists in a novel mode of packing the faucet.

To these ends the invention consists in the construction and combination of parts, which will hereinafter be more fully described, and then set forth in the claims.

In the drawings, Figure 1 is a longitudinal view of a beer-faucet constructed according to my invention. Fig. 2 is a longitudinal section of the bushing and closed faucet. Fig. 3 is a longitudinal section of the bushing and open faucet.

The letter A designates a bushing or thimble, which fits into the tap-hole of the barrel or keg, and is provided with a screw-threaded bore or socket, and with a smooth or externally-threaded body. The external thread, when used, may be termed a "wood-screw," as it screws or cuts into the wood of the barrel, and the internal thread receives the screw-threaded body or shank portion of a valve or plug, B. The latter is constructed with an inner flange, C, which closes against the inner end of the bushing, and serves to prevent the discharge of beer therethrough. A packing-collar, D, of leather, rubber, or other material, encircles the plug B and rests against the flange C. The portion O of the plug adjacent to said flange is left plain or smooth, and is slightly larger in diameter than the screw-threaded portion thereof. The inner end of the bore of the bushing is made without a screw-thread, as is shown at P, so as to receive the above smooth portion of the plug. The construction stated will effectually prevent the passage of beer through the plug until the latter has been sufficiently moved to cause the openings E therein to pass beyond the inner end of the bushing. Said openings E are arranged in the form of a zone and communicate with the interior bore of the plug. Grooves or notches F, made in the front end of the plug, serve to receive projections or lugs G on the rear end of faucet H. These grooves and projections are both devoid of screw-threads, as is shown in Figs. 2 and 3. The inner portion of the faucet H is constructed with an external screw-thread, which engages with the screw-thread of the plug. A packing washer or collar, I, encircling the faucet-barrel, serves to prevent leakage by coming in contact with an outer flange, J, of the bushing after the faucet has been introduced into the latter. This packing is pressed against the barrel by a spiral spring, N, encircling the faucet-barrel, which spring is compressed when the faucet has been inserted into the bushing and the liquid is running.

The operation is as follows: The plug, when in its normal position, fits into the bushing, so as to cause its inner unthreaded portion and packing-washer to effectually exclude liquid from the interior of the bushing, even though the screw-threads should be worn off. In order to start the flow of the liquid, the projections of the faucet are entered into the notches of the plug, which insures a connection between these parts. The faucet is then screwed into the bushing, which will cause the plug to turn in the same, so as to move its rear flange and unthreaded portion away from the inner end of the bushing. The openings in the plug are thus brought into position for permitting the liquid to pass therethrough into the plug and the faucet. It will be obvious, however, that the flow of liquid cannot take place until the connection between the faucet and plug is properly made and the latter has been moved far enough back to take the unthreaded portion thereof out of the corresponding seat in the end of the bushing. By screwing in the plug more or less the flow of the liquid is regulated to adapt it for use with low or high pressure beer.

Having thus described my invention, what I claim as new, and desire to secure by Letters Patent, is—

1. The combination of the externally-screw-threaded plug-valve B, having the rear smooth portion or plug, O, of larger diameter than the screw-threaded portion, the terminal flange C, the packing-washer D, and the outlet-openings E, located in rear of the screw-thread, with the bushing A, having an internal screw-thread and smooth end chamber, P, for the reception of the correspondingly-shaped plug-valve, and the faucet-barrel A, adapted for connection with the bushing and plug-valve, as and for the purpose set forth.

2. The combination of the external packing-washer and spiral pressure-spring with the faucet-barrel and bushing, as and for the purpose set forth.

In testimony whereof I affix my signature in presence of two witnesses.

RUDOLPH EBERHARD.

Witnesses:
 JOHN GANTNER,
 C. ARNOLD.